(12) United States Patent
Zafar et al.

(10) Patent No.: US 8,781,994 B2
(45) Date of Patent: Jul. 15, 2014

(54) PERSONALITY / POPULARITY ANALYZER

(75) Inventors: Shadman Zafar, Coppell, TX (US);
Shahzaib Zafar, Coppell, TX (US);
Brian F. Roberts, Dallas, TX (US);
Japan A. Mehta, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 547 days.

(21) Appl. No.: 12/818,769

(22) Filed: Jun. 18, 2010

(65) Prior Publication Data

US 2011/0313967 A1    Dec. 22, 2011

(51) Int. Cl.
*G06F 15/00* (2006.01)
*G06F 15/18* (2006.01)

(52) U.S. Cl.
USPC ................................................ 706/62

(58) Field of Classification Search
None
See application file for complete search history.

(56) References Cited

U.S. PATENT DOCUMENTS

| | | | |
|---|---|---|---|
| 2001/0032120 A1* | 10/2001 | Stuart et al. | 705/11 |
| 2008/0318563 A1* | 12/2008 | Ross et al. | 455/418 |
| 2010/0080412 A1 | 4/2010 | Zafar et al. | |
| 2010/0290603 A1* | 11/2010 | Gemayel et al. | 379/93.25 |
| 2010/0306185 A1* | 12/2010 | Smith et al. | 707/709 |
| 2011/0009103 A1* | 1/2011 | Do | 455/414.3 |
| 2012/0157075 A1* | 6/2012 | Ross et al. | 455/418 |

OTHER PUBLICATIONS

Kapur and Verma, Quality, Reliability and Information Technology, Trends and Future Directions. First Edition pp. 444 and 445.*
Fawcett and Provost, Combining Data Mining and Machine learning for Effective User Profiling, KDD-96 Proceedings 1996 p. 10.*
Kapur and Verma, Quality, Reliability and Information Technology, Trends and Future Directions, 1st Ed., pp. 444-445, 2006.*

* cited by examiner

*Primary Examiner* — Kakali Chaki
*Assistant Examiner* — Vincent Gonzales

(57) ABSTRACT

A device receives communication information from a user device associated with a user, calculates an extrovert score for the user based on the communication information, and calculates a popularity score for the user based on the communication information. The device also calculates an interesting communicator score for the user based on the communication information, determines a personality score for the user based on the extrovert score, the popularity score, and the interesting communicator score, and stores the personality score.

20 Claims, 19 Drawing Sheets

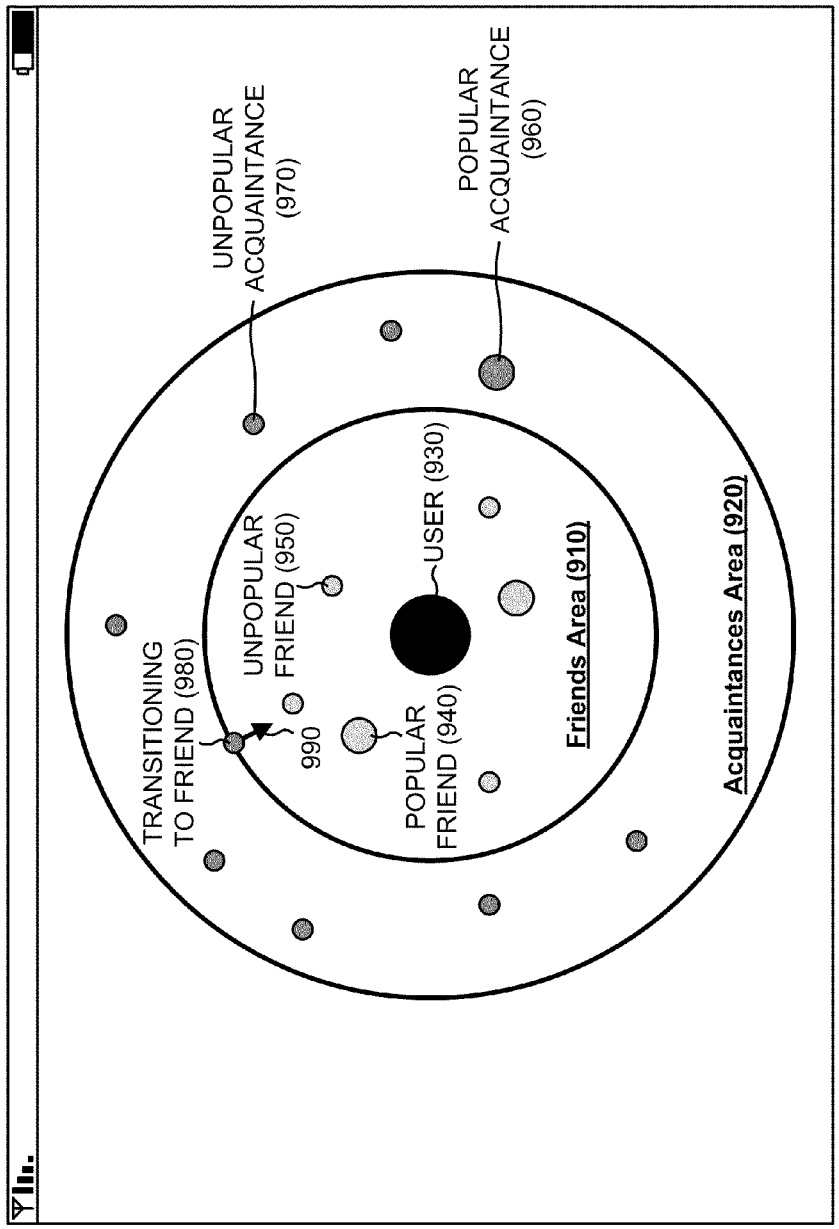

PERSONALITY / POPULARITY ANALYZER

BACKGROUND

Electronic communications technologies have interconnected people and allowed for distribution of information (e.g., in various forms) among people. For example, social networking applications, which allow people to virtually connect with one another, have become enormously popular. Other electronic communication mediums, including email, telephone, instant messaging, and text messaging have also grown in popularity.

It is often difficult for a user of such communication mediums to track the quantity, frequency, and/or relative quality of communications between the user and friends, acquaintances, and/or other users connected to the user in some way. Thus, the user cannot determine how popular (or unpopular) he or she is with the one or more other users, and/or cannot determine how popular (or unpopular) the one or more other users are (e.g., based on use of such communication mediums). The user also cannot discern his/her personality and/or the personalities of the one or more other users based on use of such communication mediums.

BRIEF DESCRIPTION OF THE DRAWINGS

FIG. 9 is a diagram of an example circle of friends/acquaintances user interface capable of being generated by one of the user devices and/or the personality analyzer device depicted in FIG. 1;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable a user of one or more user devices (e.g., mobile communication devices, personal computers, laptop computers, etc.) to determine a personality score of the user based on the user's communications behaviors (e.g., via the one or more user devices). In one implementation, for example, the systems and/or methods may receive communication information from user device(s) associated with a user, may calculate an extrovert score for the user based on the communication information, and may calculate a popularity score for the user based on the communication information. The systems and/or methods may calculate an interesting communicator score for the user based on the communication information, may determine a personality score for the user based on the extrovert, popularity, and interesting communicator scores, and may provide the personality score to a particular user device associated with the user. The systems and/or methods may provide, in a graphic and to the particular user device, personality scores of other users. The user may select one of the other users, via the graphic, and the particular user device may communicate with a user device associated with the selected other user.

As used herein, the term "user" is intended to be broadly interpreted to include a user device or a user of a user device.

Figure 1:
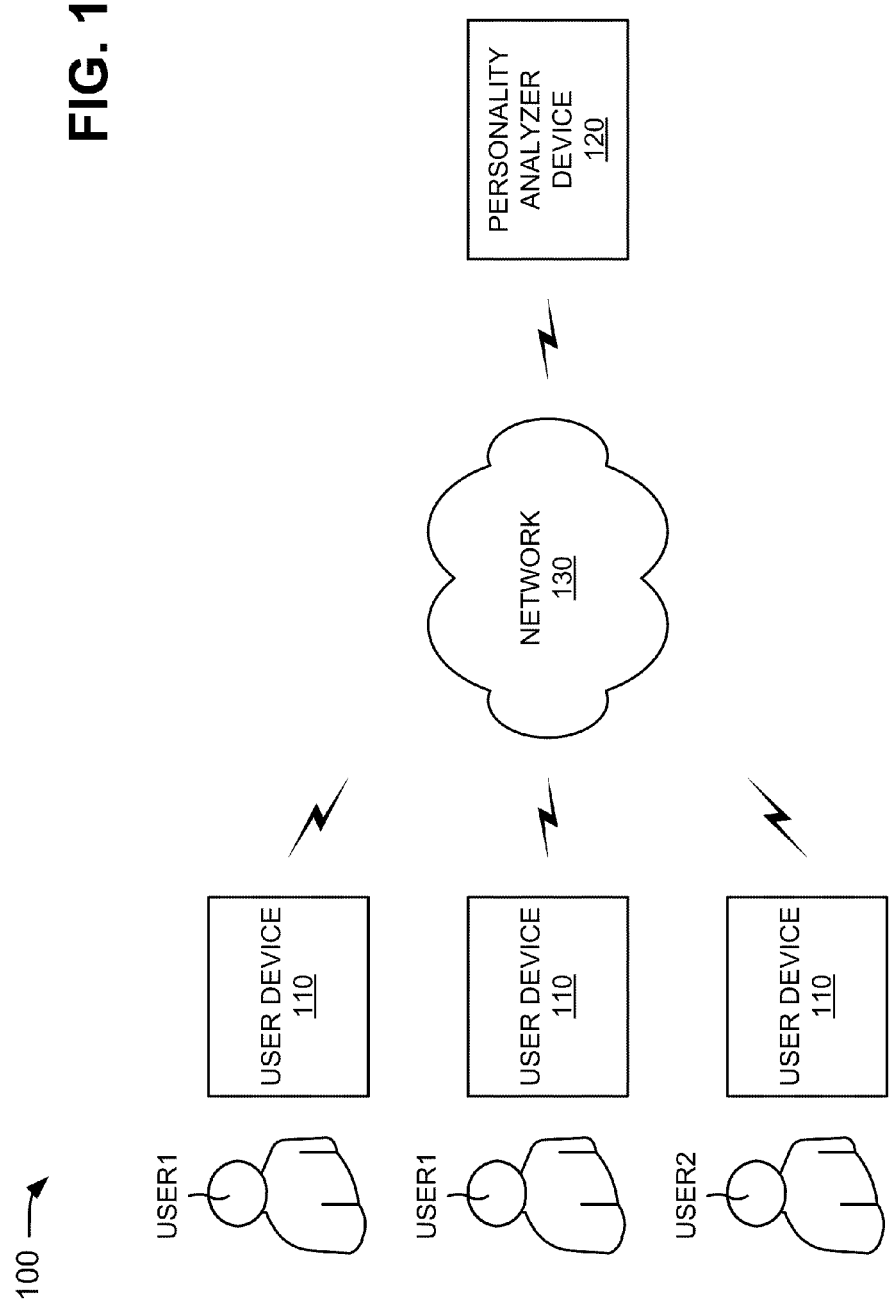
FIG. 1 is a diagram of an example network in which systems and/or methods described herein may be implemented.

FIG. 1 is a diagram of an example network 100 in which systems and/or methods described herein may be implemented. As illustrated, network 100 may include one or more user devices 110 and a personality analyzer device 120 interconnected by a network 130. Components of network 100 may interconnect via wired and/or wireless connections. Three user devices 110, a single personality analyzer device 120, and a single network 130 have been illustrated in FIG. 1 for simplicity. In practice, there may be more user devices 110, personality analyzer devices 120, and/or networks 130. Also, in some instances, one or more of the components of network 100 may perform one or more functions described as being performed by another one or more of the components of network 100.

User device 110 may include any device that is capable of communicating with personality analyzer device 120 (and/or other user devices 110) via network 130. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a cellular telephone, a smart phone, other types of mobile communication devices, a laptop computer, a personal computer, a set-top box (STB), a television, a gaming system, a global positioning system (GPS) device, a content recording device (e.g., a camera, a video camera, etc.), a vehicular computing and/or communication device, etc.

As further shown in FIG. 1, a first user (e.g., USER1) may be associated with more than one user device 110 (e.g., USER1 may be associated with two user devices 110), and a second user (e.g., USER2) may be associated with a single user device 110.

Personality analyzer device 120 may include one or more server devices, or other types of computation or communication devices, that gather, process, and/or provide information in a manner described herein. Personality analyzer device 120 may include a device that is capable of communicating with user devices 110 via network 130. In one example, personality analyzer device 120 may include a server device, a laptop computer, a personal computer, a workstation computer, etc. that provides a personality analyzer service to users of user devices 110. In one implementation, personality analyzer device 120 may receive communication information from user devices 110 associated with a user (e.g., USER1), may calculate an extrovert score for the user based on the communication information, and may calculate a popularity score for the user based on the communication information. Personality analyzer device 120 may calculate an interesting communicator score for the user based on the communication information, may determine a personality score for the user based on the extrovert, popularity, and interesting communicator scores, and may provide the personality score to a particular user device 110 associated with the user. Personality analyzer device 120 may provide, in a graphic and to the particular user device 110, personality scores of other users (e.g., USER2). The user (e.g., USER1) may select one of the other users (e.g., USER2), via the graphic, and the particular user device 110 may communicate with a user device 110 associated with the selected other user (e.g., USER2).

Network 130 may include a local area network (LAN), a wide area network (WAN), a metropolitan area network (MAN), a telephone network, such as the PSTN, a cellular network, a Wi-Fi network, an intranet, the Internet, an optical fiber (or fiber optic)-based network, or a combination of networks.

Although FIG. 1 shows example components of network 100, in other implementations, network 100 may contain fewer components, different components, differently arranged components, or additional components than depicted in FIG. 1.

Figure 2:
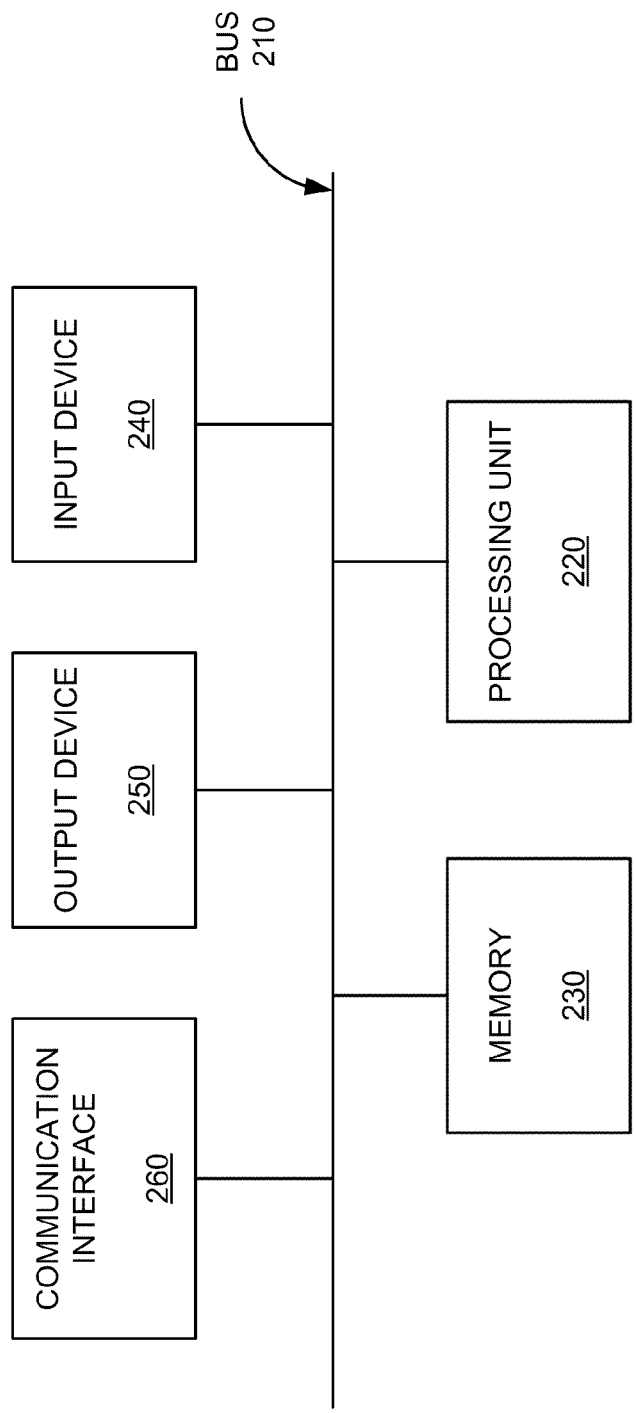
FIG. 2 is a diagram of example components of one of the devices depicted in FIG. 1.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. In still other implementations, one or more components of device 200 may perform one or more other tasks described as being performed by one or more other components of device 200.

Figure 3:
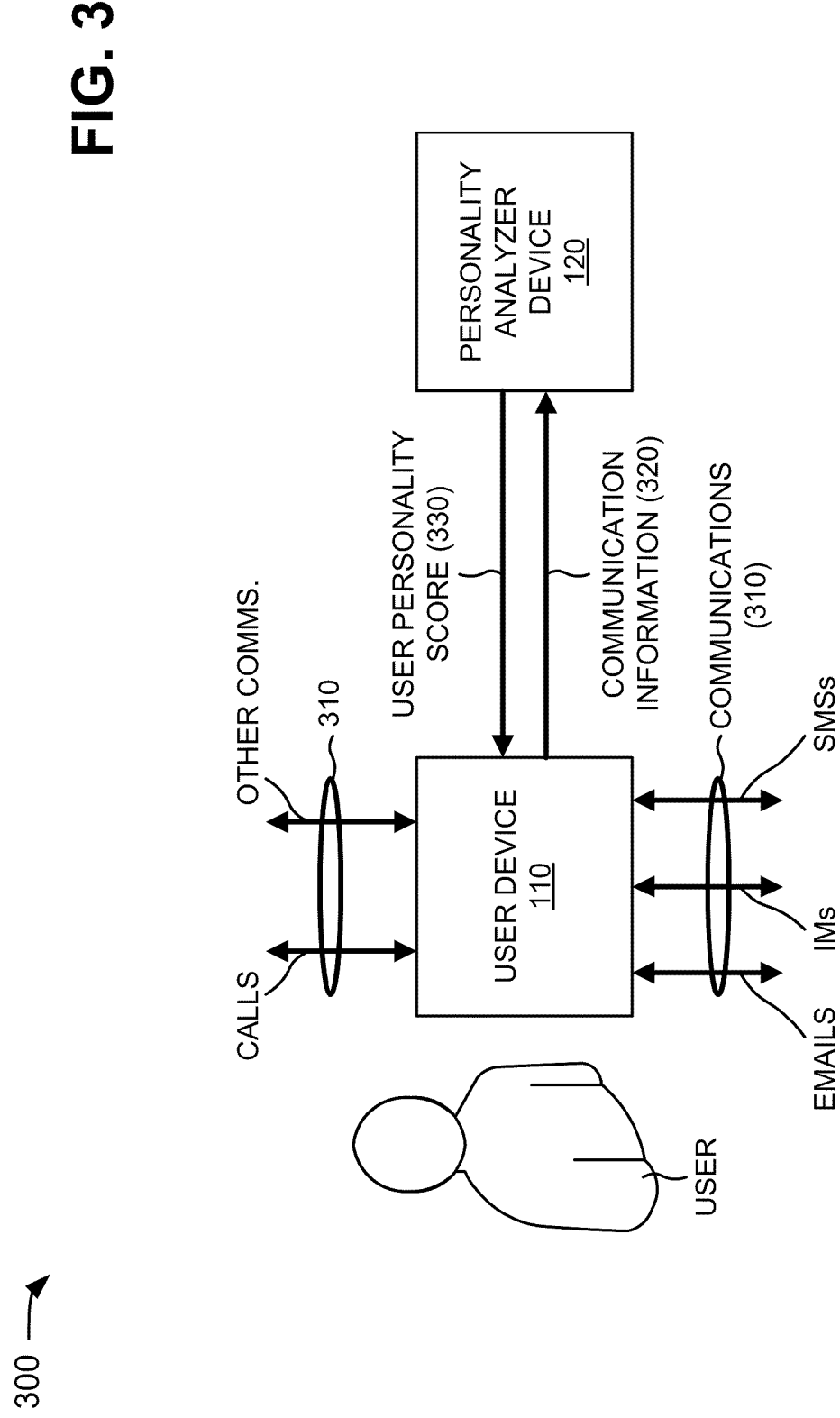
FIG. 3 is a diagram of example operations capable of being performed by a portion of the network depicted in FIG. 1.

FIG. 3 is a diagram of example operations capable of being performed by a portion 300 of network 100. As shown, network portion 300 may include user device 110 and personality analyzer device 120. User device 110 and personality analyzer device 120 may include the features described above in connection with one or more of FIGS. 1 and 2.

As further shown in FIG. 3, a user of user device 110 may be involved in multiple communications 310 (e.g., with other users) via user device 110. In one implementation, the user may be associated with additional user devices 110, and may be involved in further communications 310 (e.g., with other users) via the additional user devices 110. Communications 310 may include electronic content, such as text, one or more messages (e.g., short message service (SMS) messages, electronic mail (email) messages, multimedia message service (MMS) messages, or instant messages (IMs)), one or more telephone calls, one or more other types of communications, one or more symbols, one or more graphics, one or more images (e.g., digital photographs and video frames), video, audio, multimedia, video games, or any segment, component, or combination of these or other forms of electronic content (or metadata associated with the content) that may be viewed or otherwise experienced by a user.

User device 110 may utilize communications 310 to generate communication information 320. Communication information 320 may include types, amounts, frequencies, sources, targets, and/or durations of one or more communications 310 between the user and one or more other users. A "type" of communication may refer to a particular communication mode (e.g., telephone calls, SMS messages, etc.) used to communicate information. An "amount" of communication may refer to a quantity of communications 310 initiated and/or received by the user (e.g., via user device 110). A "frequency" of communication may refer to how often communications 310 are initiated and/or received by the user (e.g., via user device 110). A "source" of communication may refer to a particular user and/or user device 110 that initiates communications 310. A "target" of communication may refer to a particular user and/or user device 110 that receives communications 310. A "duration" of communication may refer to an amount of time that elapses during one or more communications 310. User device 110 may provide communication information 320 to personality analyzer device 120.

Alternatively, or additionally, personality analyzer device 120 may communicate with user device 110 (e.g., to analyze communications 310), and may determine communication information 320 based on the analyzed communications 310. Personality analyzer device 120 may receive (or generate) communication information 320, and may calculate a user personality score 330 based on communication information 320. User personality score 330 may include a score (e.g., a value) that quantifies the user's personality based on communication behaviors of the user. User personality score 330 may provide a measure (e.g., based on communication behaviors) of whether the user is an extrovert, whether the user is popular (e.g., locally, nationally, etc.), and/or whether the user is an interesting communicator (e.g., likely to have interesting communications with different users). Further details of how personality analyzer device 120 calculates user personality score 330 is provided below in connection with, for example, FIG. 5. As further shown in FIG. 3, personality analyzer device 120 may provide user personality score 330 to user device 110 (e.g., for display to the user).

In one implementation, user device 110 may calculate a device-specific user personality score 330 based on communications 310 and/or communication information 320 associated with user device 110.

Although FIG. 3 shows example components of network portion 300, in other implementations, network portion 300 may contain fewer components, different components, differently arranged components, or additional components than depicted in FIG. 3. Alternatively, or additionally, one or more components of network portion 300 may perform one or more other tasks described as being performed by one or more other components of network portion 300.

Figure 4:
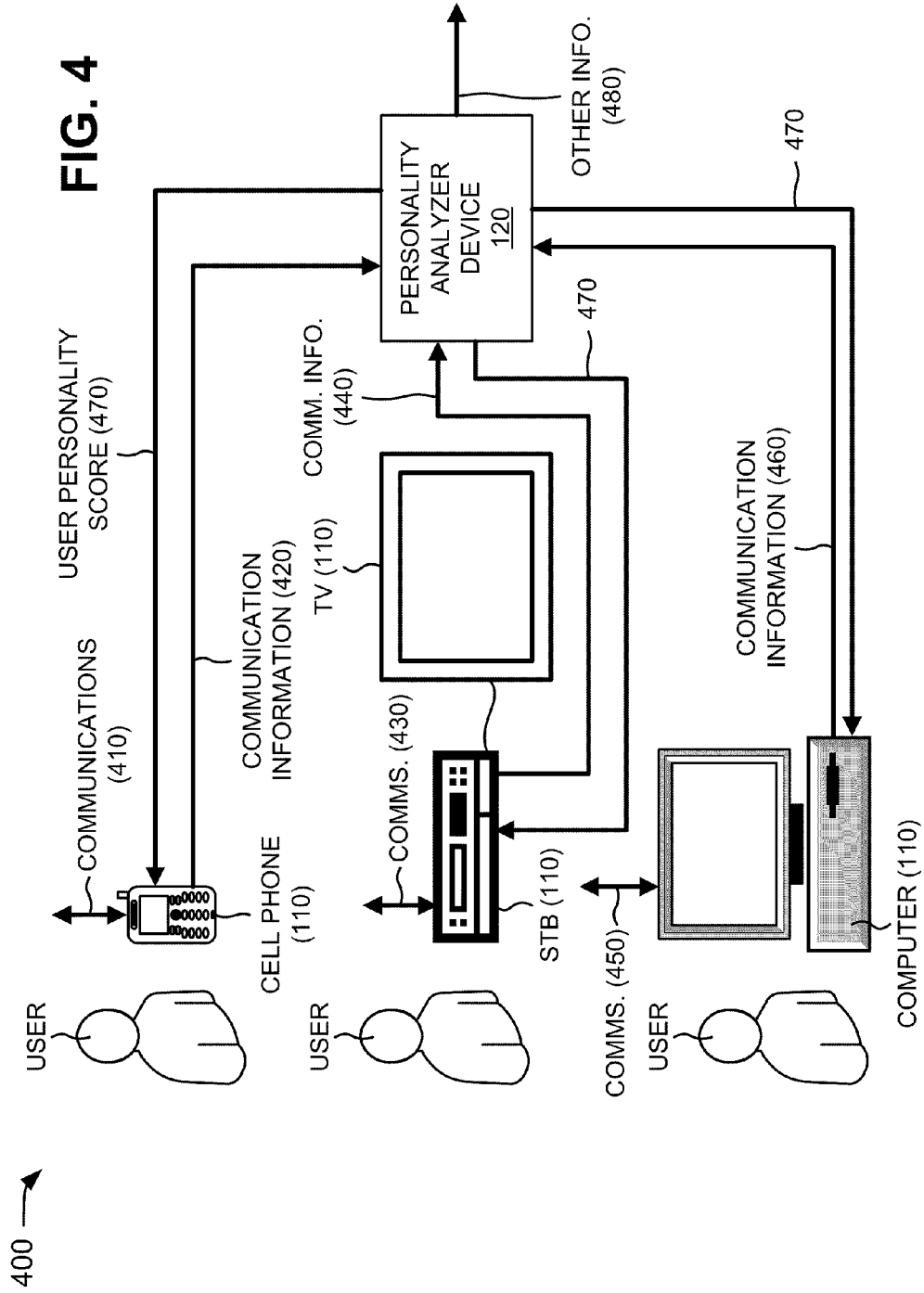
FIG. 4 is a diagram of example operations capable of being performed by another portion of the network depicted in FIG. 1.

FIG. 4 is a diagram of example operations capable of being performed by another portion 400 of network 100. As shown, network portion 400 may include multiple user devices 110 associated with a single user, and personality analyzer device 120. User devices 110 and personality analyzer device 120 may include the features described above in connection with one or more of FIGS. 1-3. In one example, a first user device 110 may include a cellular telephone, a second user device 110 may include a STB connected to a television (TV), and a third user device 110 may include a computer.

As further shown in FIG. 4, the user may be involved in multiple communications 410 (e.g., with other users) via cell phone 110. Communications 410 may include electronic content, such as one or more telephone calls, one or more messages (e.g., SMS messages, email messages, MMS messages, or IMs), and/or one or more other types of communications that may be viewed or otherwise experienced by the user (e.g., via cell phone 110).

Cell phone 110 may utilize communications 410 to generate communication information 420. Communication information 420 may include types, amounts, frequencies, sources, and/or durations of one or more communications 410 between the user (e.g., via cell phone 110) and one or more other users. For example, communication information 420 may include an amount of telephone calls received by cell phone 110, an amount of telephone calls place by cell phone 110, etc. Cell phone 110 may provide communication information 420 to personality analyzer device 120. Alternatively, or additionally, personality analyzer device 120 may communicate with cell phone 110 (e.g., to analyze communications 410), and may determine communication information 420 based on the analyzed communications 410.

The user may also be involved in multiple communications 430 (e.g., with other users) via STB/TV 110. Communications 430 may include electronic content, such as television content (e.g., channel selections, video on demand (VOD) content, pay-per-view (PPV) content, interactions with a program guide, advertisements, interactive television applications (e.g., "widgets"), etc.), one or more messages (e.g., SMS messages, email messages, MMS messages, or IMs), one or more telephone calls, and/or one or more other types of communications that may be viewed or otherwise experienced by the user (e.g., via STB/TV 110).

STB/TV 110 may utilize communications 430 to generate communication information 440. Communication information 440 may include types, amounts, frequencies, sources, and/or durations of one or more communications 430 associated with the user (e.g., via STB/TV 110). For example, communication information 440 may include an amount of advertisements viewed by the user via STB/TV 110, types of television programming viewed by the user via STB/TV 110, etc. STB/TV 110 may provide communication information 440 to personality analyzer device 120. Alternatively, or additionally, personality analyzer device 120 may communicate with STB/TV 110 (e.g., to analyze communications 430), and may determine communication information 440 based on the analyzed communications 430.

The user may further be involved in multiple communications 450 (e.g., with other users) via computer 110. Communications 450 may include electronic content, such as Internet-based content (e.g., accessing chat rooms, blogs, social networking web sites, other web sites, etc.), one or more messages (e.g., SMS messages, email messages, MMS messages, or IMs), one or more telephone calls, and/or one or more other types of communications that may be viewed or otherwise experienced by the user (e.g., via computer 110).

Computer 110 may utilize communications 450 to generate communication information 460. Communication information 460 may include types, amounts, frequencies, sources, and/or durations of one or more communications 450 associated with the user (e.g., via computer 110). For example, communication information 460 may include a duration of time the user spends on a social networking web site, a duration of time the user spends in a chat room, an amount of instant messages sent/received by the user, etc. Computer 110 may provide communication information 460 to personality analyzer device 120. Alternatively, or additionally, personality analyzer device 120 may communicate with computer 110 (e.g., to analyze communications 450), and may determine communication information 460 based on the analyzed communications 450.

Personality analyzer device 120 may receive (or generate) communication information 420, 440, and 460, and may calculate a user personality score 470 based on communication information 420, 440, and/or 460. User personality score 470 may include a score (e.g., a value) that quantifies the user's personality based on communication behaviors of the user. User personality score 470 may provide a measure (e.g., based on communication behaviors) of whether the user is an extrovert, whether the user is popular (e.g., locally, nationally, etc.), and/or whether the user is an interesting communicator (e.g., likely to have interesting communications with different users). As further shown in FIG. 4, personality analyzer device 120 may provide user personality score 470 to cell phone 110, STB/TV 110, and/or computer 110 (e.g., for display to the user).

In one implementation, personality analyzer device 120 may calculate a device-specific user personality score for cell phone 110 (e.g., based on communication information 420), another device-specific user personality score for STB/TV 110 (e.g., based on communication information 440), and/or still another device-specific user personality score for computer 110 (e.g., based on communication information 460).

Although FIG. 4 shows example components of network portion 400, in other implementations, network portion 400 may contain fewer components, different components, differently arranged components, or additional components than depicted in FIG. 4. Alternatively, or additionally, one or more components of network portion 400 may perform one or more other tasks described as being performed by one or more other components of network portion 400.

Figure 5:
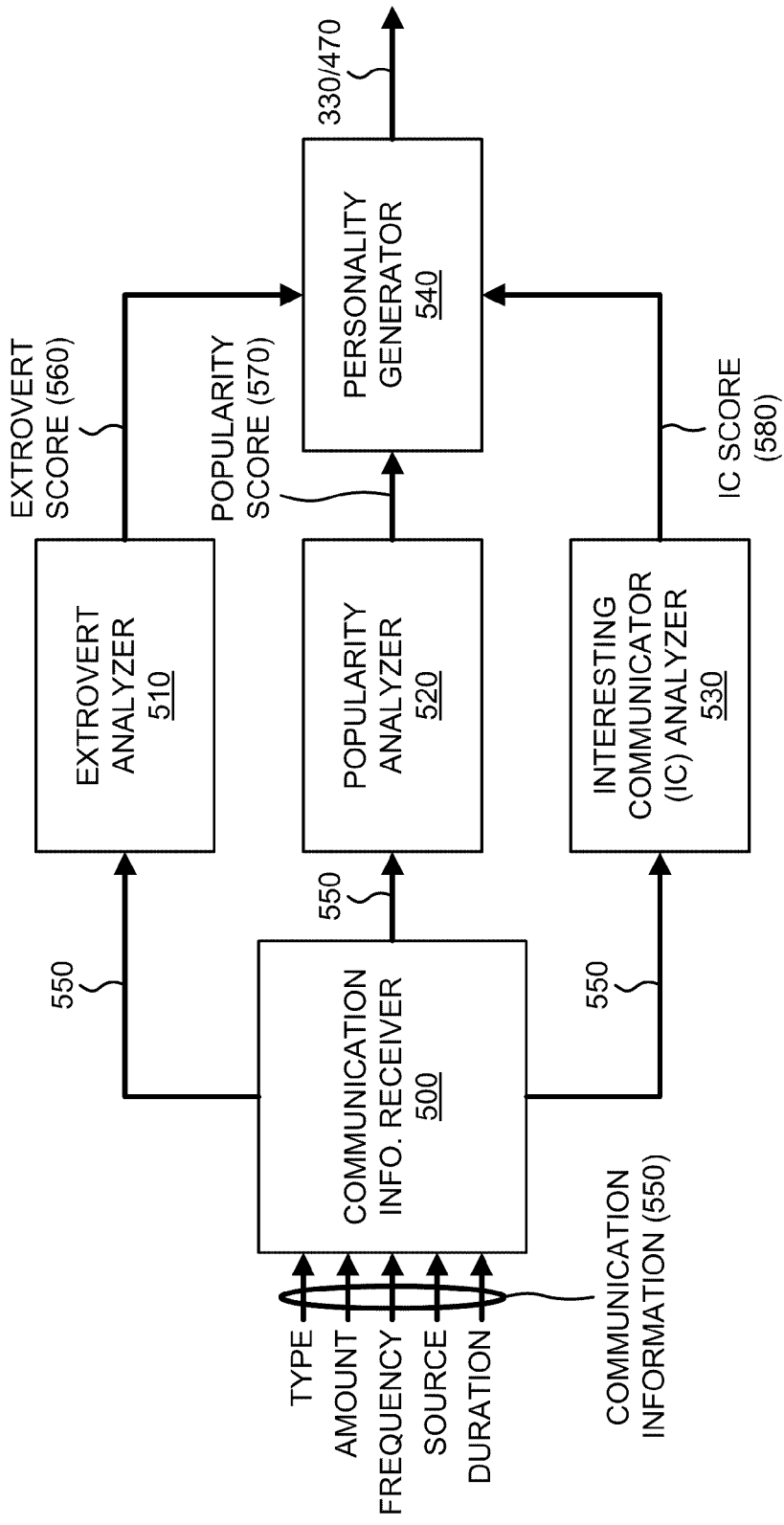
FIG. 5 is a diagram of example functional components of a personality analyzer device of the network depicted in FIG. 1.

FIG. 5 is a diagram of example functional components of personality analyzer device 120. In one implementation, the functions described in connection with FIG. 5 may be performed by one or more of the components of device 200 (FIG. 2). As shown in FIG. 5, personality analyzer device 120 may include a communication information receiver 500, an extrovert analyzer 510, a popularity analyzer 520, an interesting communicator (IC) analyzer 530, and a personality generator 540.

Communication information receiver 500 may include hardware or a combination of hardware and software that may receive communication information 550 from one or more user devices 110 (not shown) associated with a user. Communication information 550 may include types, amounts, frequencies, sources, and/or durations of one or more communications. Alternatively, or additionally, communication information receiver 500 may communicate with user devices 110 (e.g., to analyze communications generated by user devices 110), and may determine communication information 550 based on the analyzed communications. As further shown in FIG. 5, communication information receiver 500 may provide communication information 550 to extrovert analyzer 510, popularity analyzer 520, and IC analyzer 530.

Extrovert analyzer 510 may include hardware or a combination of hardware and software that may receive communication information 550 from communication information receiver 500, and may calculate an extrovert score 560 for the user based on communication information 550. Extrovert score 560 may provide a measure of whether the user is an extrovert or an introvert (e.g., in a given geographical region) compared to a statistical mean. In one implementation, extrovert analyzer 510 may determine (e.g., from communication information 550) a total number of outgoing calls (TOC) placed by the user to different phone numbers during a time period (t) over which statistics are collected; and an average number of total outing calls (AOC) placed by other users in the given geographical region during the time period (t). In one example, the time period (t) may be weekly to remove seasonal biases (e.g., during the Christmas season a ratio of external calls to family calls may decrease). Extrovert analyzer 510 may calculate extrovert score (E) 560 according to the following equation:

$$E = \frac{TOC}{AOC}.$$

For example, extrovert analyzer 510 may determine extrovert score 560 (e.g., for a particular user in the Dallas, Tex. region) that is greater than an average extrovert score for all users in the Dallas, Tex. region. This may indicate that the particular user is an above-average extrovert in the region. As further shown in FIG. 5, extrovert analyzer 510 may provide extrovert score 560 to personality generator 540.

Popularity analyzer 520 may include hardware or a combination of hardware and software that may receive communication information 550 from communication information receiver 500, and may calculate a popularity score 570 for the user based on communication information 550. Popularity score 570 may provide a measure of popularity of the user (e.g., in a given geographical region) compared to a statistical mean. In one implementation, popularity analyzer 520 may determine (e.g., from communication information 550) a total number of incoming calls (TIC) received by the user from different phone numbers during a time period (t) over which statistics are collected; and an average number of total incoming calls (AIC) received by other users from different phone numbers during the time period (t). Popularity analyzer 520 may calculate popularity score (P) 570 according to the following equation:

$$P = \frac{TIC}{AIC}.$$

For example, popularity analyzer 520 may determine popularity score 570 (e.g., for a particular user in the Philadelphia, Pa. region) that is less than an average popularity score for all users in the Philadelphia, Pa. region. This may indicate that the particular user is not a very popular person in the region. As further shown in FIG. 5, popularity analyzer 520 may provide popularity score 570 to personality generator 540.

IC analyzer 530 may include hardware or a combination of hardware and software that may receive communication information 550 from communication information receiver 500, and may calculate an interesting communicator (IC) score 580 for the user based on communication information 550. IC score 580 may provide a measure of the user's likelihood of having interesting communications (e.g., conversations) with different people (e.g., in a given geographical region). In one implementation, IC analyzer 530 may determine (e.g., from communication information 550) an average length of incoming and outgoing calls (SALC) received by and/or placed by the user during a time period (t) over which statistics are collected; and an average length of incoming and outgoing calls (PALC) generated by other users in the geographical region during the time period (t). IC analyzer 530 may calculate IC score (IC) 580 according to the following equation:

$$IC = \frac{SALC \times E + SALC \times P}{PALC \times 2},$$

where "E" may correspond to extrovert score 560 and "P" may correspond to popularity score 570. For example, IC analyzer 530 may determine IC score 580 (e.g., for a particular user in the San Diego, Calif. region) that is greater than an average IC score for all users in the San Diego, Calif. region. This may indicate that the particular user is more of an interesting communicator than other users in the region. As further shown in FIG. 5, IC analyzer 530 may provide IC score 580 to personality generator 540.

Personality generator 540 may include hardware or a combination of hardware and software that may receive extrovert score 560 from extrovert analyzer 510, may receive popularity score 570 from popularity analyzer 520, and may receive IC score 580 from IC analyzer 530. Personality generator 540 may generate user personality score 330 (or 470) based on extrovert score 560, popularity score 570, and/or IC score 580. In one implementation, personality generator 540 may generate user personality score 330 (or 470) based on a weighted average of extrovert score 560, popularity score 570, and/or IC score 580. For example, if personality generator 540 assigns a first weight (w1) to extrovert score (E) 560, a second weight (w2) to popularity score (P) 570, and a third weight (w3) to IC score (IC) 580, personality generator 540 may generate user personality score (PS) 330 (or 470) according to the following equation:

$$PS = w1 \times E + w2 \times P + w3 \times IC.$$

Personality generator 540 may provide user personality score 330 (or 470) to one or more user devices 110 associated with the user. Alternatively, or additionally, personality generator 540 may store user personality score 330 (or 470) (e.g., in memory 230).

In one implementation, personality generator 540 may generate user personality scores for friends and/or acquaintances of a user. The friends and/or acquaintances of the user may be determined (e.g., by personality analyzer device 120) based on a variety of information, such as communication information 550; address book information (e.g., email addresses, telephone numbers, incoming emails, outgoing emails, incoming calls, outgoing calls, etc.) associated with the user; account information (e.g., user profile information, contacts, etc.) associated with the user; etc. Personality generator 540 may provide the user personality scores for the friends and/or acquaintances to one or more user devices 110 associated with the user. Further details of friends and/or acquaintances are provided below in connection with, for example, FIGS. 9-11.

Although FIG. 5 shows example functional components of personality analyzer device 120, in other implementations, personality analyzer device 120 may contain fewer functional components, different functional components, differently arranged functional components, or additional functional components than depicted in FIG. 5. Alternatively, or additionally, one or more functional components of personality analyzer device 120 may perform one or more other tasks described as being performed by one or more other functional components of personality analyzer device 120. For example, although FIG. 5 discusses using call information (e.g., incoming and outgoing calls) to determine extrovert score 560, popularity score 570, and/or IC score 580, in other implementations one or more different types of communications (e.g., emails, SMSs, IMs, etc.) may be utilized to determine extrovert score 560, popularity score 570, and/or IC score 580. In another example, certain types of communications (e.g., amount of television viewing, duration of television viewing, etc.) may decrease extrovert score 560, popularity score 570, and/or IC score 580, while other types of communications (e.g., amount of telephone calls, duration of telephone calls, etc.) may increase extrovert score 560, popularity score 570, and/or IC score 580.

FIGS. 6-11 are diagrams of example user interfaces capable of being generated by user devices 110 and/or personality analyzer device 120. The user interfaces depicted in FIG. 6-11 may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of user devices 110 and/or personality analyzer device 120 (e.g., via a touch screen display, control buttons, and/or a keypad).

Figure 6:
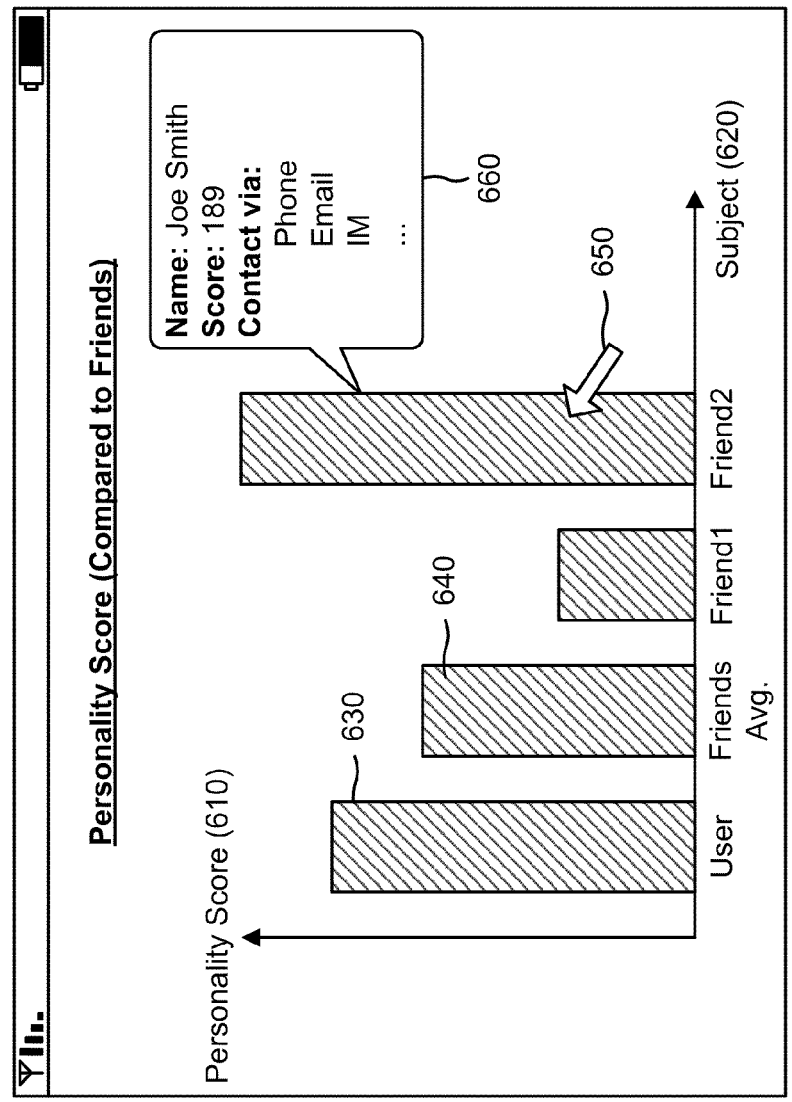
FIG. 6 is a diagram of an example friend-based personality score user interface capable of being generated by one of the user devices and/or the personality analyzer device depicted in FIG. 1.

FIG. 6 is a diagram of an example friend-based personality score user interface 600 capable of being generated by one of user devices 110 and/or personality analyzer device 120. In one implementation, user interface 600 may be provided as part of user personality score 330 (FIG. 3) or user personality score 470 (FIG. 4). As shown in FIG. 6, user interface 600 may include a graphical analysis (e.g., a bar graph) of a user's personality score in comparison to personality scores of the user's friends. This may enable the user to rate his/her personality (e.g., popularity, etc.) against the personalities of the user's friends.

The bar graph may include a personality score axis 610, a subject axis 620, a bar 630 indicating the personality score of the user, a bar 640 indicating the average personality score for the user's friends, and bars indicating personality scores for each of the user's friends. As shown in FIG. 6, the user may have a higher personality score than the average personality score for the user's friends. A first friend (e.g., "Friend1") may have a lower personality score than the user, and a second friend (e.g., "Friend2") may have a higher personality score than the user.

As further shown in FIG. 6, a selection mechanism 650 (e.g., a pointer) may be used to select (or hover over) one of the bars of the bar graph. For example, when selection mechanism 650 selects (or hovers over) the bar associated with the second friend, information about the second friend may be displayed in a window 660. Such information may include a name of the second friend (e.g., "Joe Smith"), a user personality score of the second friend (e.g., "189"), contact options (e.g., "Contact via phone, email, IM, etc.") associated with the second friend, etc.

Although user interface 600 depicts a variety of information, in other implementations, user interface 600 may depict less information, different information, differently arranged information, or additional information than depicted in FIG. 6.

Figure 7:
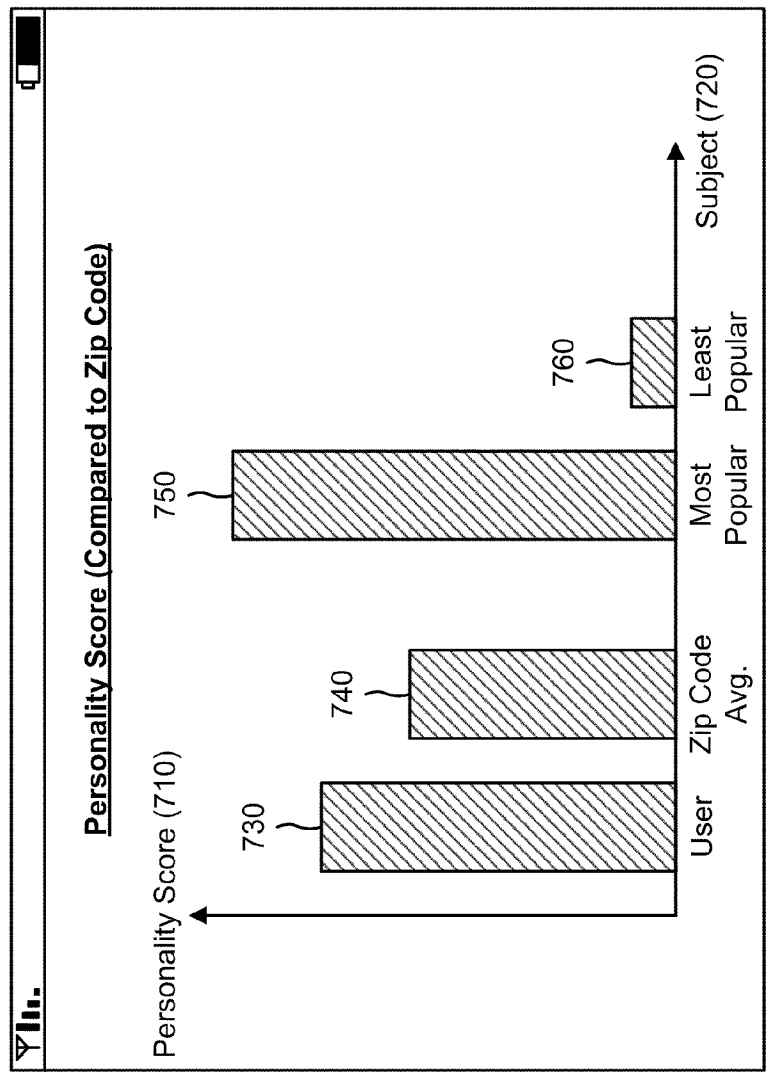
FIG. 7 is a diagram of an example zip code-based personality score user interface capable of being generated by one of the user devices and/or the personality analyzer device depicted in FIG. 1.

FIG. 7 is a diagram of an example zip code-based personality score user interface 700 capable of being generated by one of user devices 110 and/or personality analyzer device 120. In one implementation, user interface 700 may be provided as part of user personality score 330 (FIG. 3) or user personality score 470 (FIG. 4). As shown in FIG. 7, user interface 700 may include a graphical analysis (e.g., a bar graph) of a user's personality score in comparison to personality scores of users within a certain zip code (e.g., where the user is located). This may enable the user to rate his/her personality (e.g., popularity, etc.) against the personalities of the users within the certain zip code (e.g., within a certain locale).

The bar graph may include a personality score axis 710, a subject axis 720, a bar 730 indicating the personality score of the user, a bar 740 indicating the average personality score for the users in the certain zip code, a bar 750 indicating the personality score of the most popular user in the certain zip code, and a bar 760 indicating the personality score of the least popular user in the certain zip code. As shown in FIG. 7, the user may have a higher personality score than the average personality score for the users in the certain zip code. The most popular user in the certain zip code may have a higher personality score than the user, and the least popular user in the certain zip code may have a lower personality score than the user.

Although user interface 700 depicts a variety of information, in other implementations, user interface 700 may depict less information, different information, differently arranged information, or additional information than depicted in FIG. 7.

Figure 8:
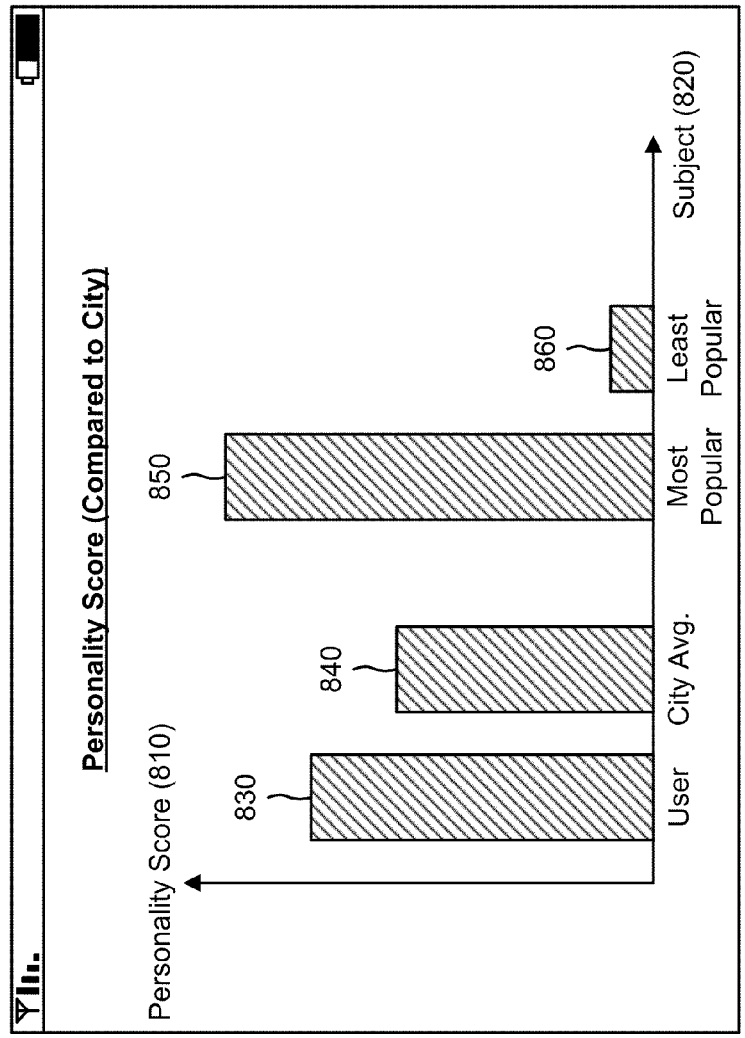
FIG. 8 is a diagram of an example city-based personality score user interface capable of being generated by one of the user devices and/or the personality analyzer device depicted in FIG. 1.

FIG. 8 is a diagram of an example city-based personality score user interface 800 capable of being generated by one of user devices 110 and/or personality analyzer device 120. In one implementation, user interface 800 may be provided as part of user personality score 330 (FIG. 3) or user personality score 470 (FIG. 4). As shown in FIG. 8, user interface 800 may include a graphical analysis (e.g., a bar graph) of a user's personality score in comparison to personality scores of users within a certain city (e.g., selected by the user). This may enable the user to rate his/her personality (e.g., popularity, etc.) against the personalities of the users within the certain city (e.g., a city the user plans to visit).

The bar graph may include a personality score axis 810, a subject axis 820, a bar 830 indicating the personality score of the user, a bar 840 indicating the average personality score for the users in the certain city, a bar 850 indicating the personality score of the most popular user in the certain city, and a bar 860 indicating the personality score of the least popular user in the certain city. As shown in FIG. 8, the user may have a higher personality score than the average personality score for the users in the certain city. The most popular user in the certain city may have a higher personality score than the user, and the least popular user in the certain city may have a lower personality score than the user.

Although user interface 800 depicts a variety of information, in other implementations, user interface 800 may depict less information, different information, differently arranged information, or additional information than depicted in FIG. 8.

FIG. 9 is a diagram of an example circle of friends/acquaintances user interface 900 capable of being generated by one of user devices 110 and/or personality analyzer device 120. In one implementation, user interface 900 may be provided as part of user personality score 330 (FIG. 3) or user personality score 470 (FIG. 4). As shown in FIG. 9, user interface 900 may include a friends area 910 and an acquaintances area 920. In one implementation, friends area 910 and/or acquaintances area 920 may be determined (e.g., by personality analyzer device 120) based on a variety of information, such as communication information 550 (FIG. 5); address book information (e.g., email addresses, telephone numbers, incoming emails, outgoing emails, incoming calls, outgoing calls, etc.) associated with a user; account information (e.g., user profile information, contacts, etc.) associated with the user; etc.

Friends area 910 may include a circular area surrounding a user 930 (e.g., a user of user device 110) and defining other users that are friends of user 930. In other implementations, friends area 910 may include a variety of shapes other than a circle. As shown in FIG. 9, user 930 may be represented by a circle (although other shapes are possible) whose area is proportional to (or representative of) a user personality score associated with user 930. For example, the larger the user personality score associated with user, the larger the area of the circle representing user 930. The friends of user 930 may also be represented by circles (although other shapes are possible) whose areas are proportional to (or representative of) user personality scores associated with the friends. For example, as shown in FIG. 9, a popular friend 940 (e.g., as provided by a user personality score) of user 930 may be represented by a larger circle than a circle representing an unpopular friend 950 (e.g., as provided by a user personality score) of user 930. Such an arrangement may enable user 930 to more easily locate (e.g., and contact via user device 110) more popular friends.

Acquaintances area 920 may include a circular area surrounding user 930 and defining other users that are acquaintances of user 930. In other implementations, acquaintances area 920 may include a variety of shapes other than a circle. The acquaintances of user 930 may be represented by circles (although other shapes are possible) whose areas are proportional to (or representative of) user personality scores associated with the acquaintances. For example, as shown in FIG. 9, a popular acquaintance 960 (e.g., as provided by a user personality score) of user 930 may be represented by a larger circle than a circle representing an unpopular acquaintance 970 (e.g., as provided by a user personality score) of user 930. Such an arrangement may enable user 930 to more easily locate (e.g., and contact via user device 110) more popular acquaintances. As further shown in FIG. 9, one of the acquaintances may be transitioning to a friend of user 930, as indicated by reference number 980. In one example, such a transition may be due to user 930 having increased communications with transitioning acquaintance 980.

In one implementation, a directional pointer 990 may be associated with each of the friends and/or acquaintances and may provide an indication of whether a friend is transitioning toward user 930 (e.g., becoming more of a friend) or away from user 930 (e.g., becoming less of a friend). Similarly, directional pointer 990 may provide an indication of whether an acquaintance is transitioning toward user 930 (e.g., toward becoming a friend) or away from user 930 (e.g., becoming less of an acquaintance). In another implementation, a user-selectable subset of the friends and/or acquaintances may be associated with directional pointers 990, or directional pointer 990 may be displayed when a contact (e.g., a friend or an acquaintance) is within some threshold distance of user 930, of the boundary of friends area 910, of the boundary of acquaintance area 920, etc.

In one example implementation, the relationships between user 930 and the friends/acquaintances may be used to provide recommendations to user 930. For example, based on such relationships, user 930 may be recommended one or more friends/acquaintances of user's 930 friends/acquaintances. In another example, the relationships may be used for determining and recommending products, services, etc. to user 930, for performing collaborative filtering, and for various other purposes.

Although user interface 900 depicts a variety of information, in other implementations, user interface 900 may depict less information, different information, differently arranged information, or additional information than depicted in FIG. 9.

Figure 10A:
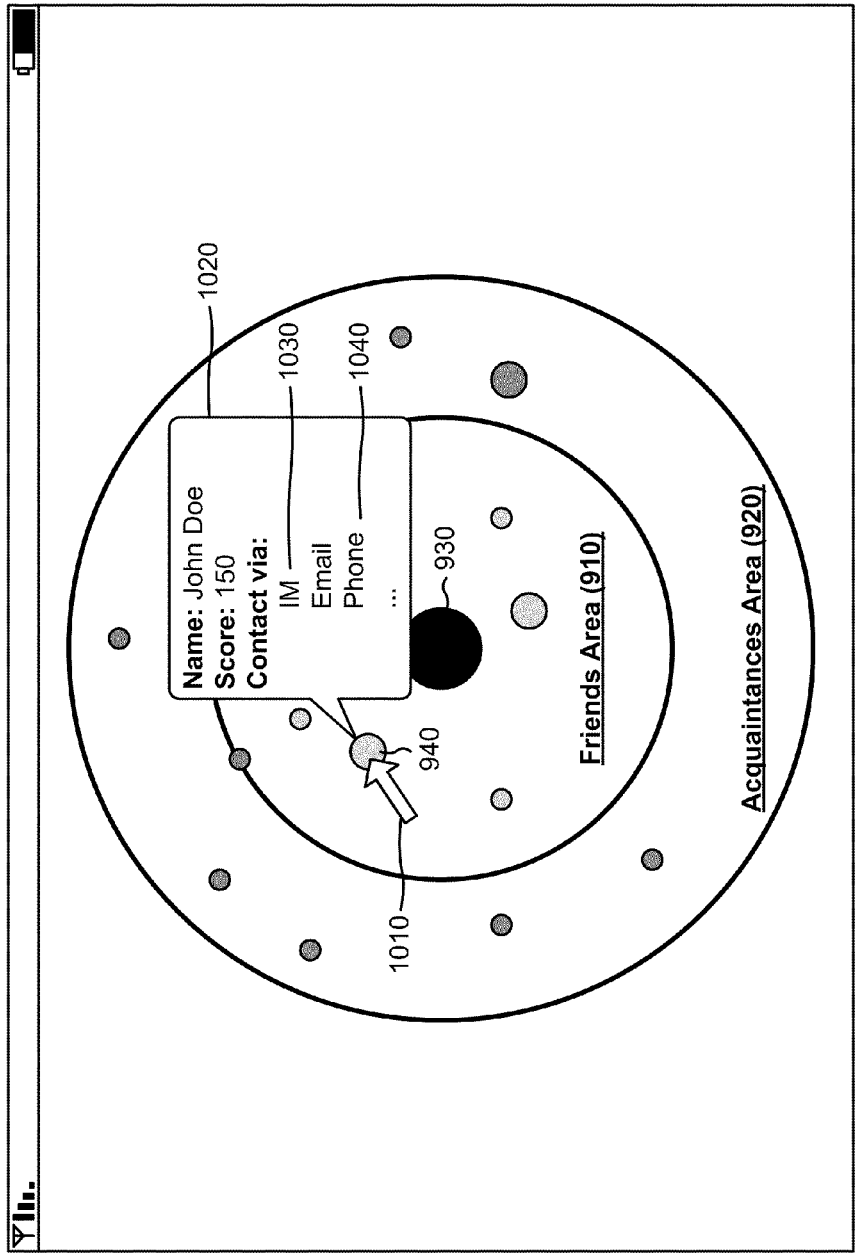
FIGS. 10A-11 are diagrams of example operations capable of being performed via the circle of friends/acquaintances user interface depicted in FIG. 9.
Figure 10B:
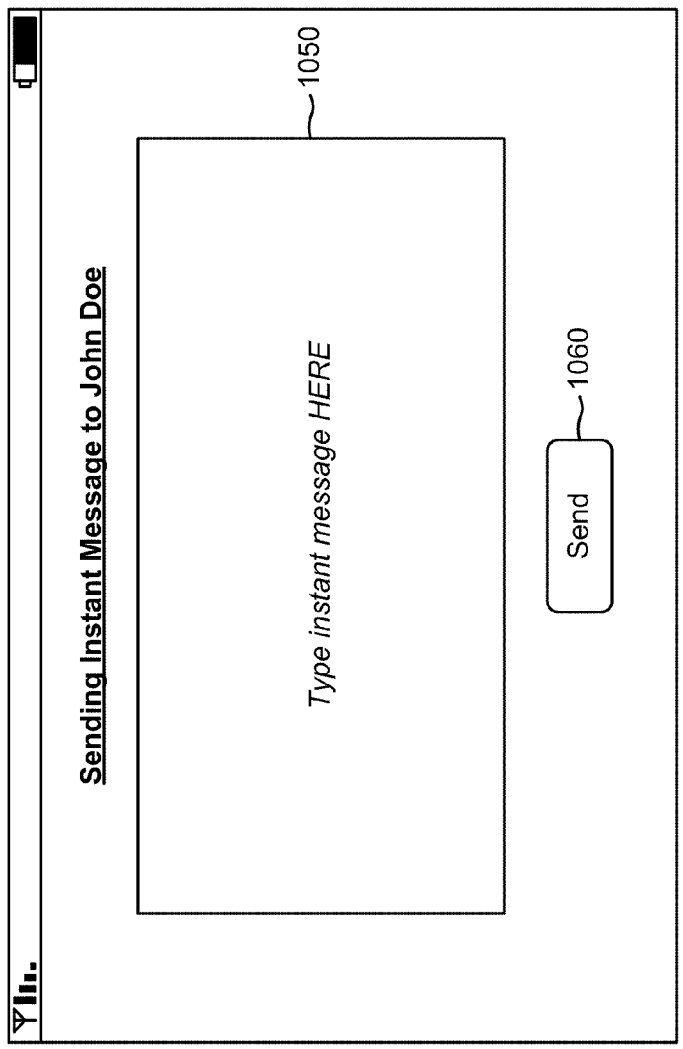
Figure 10C:
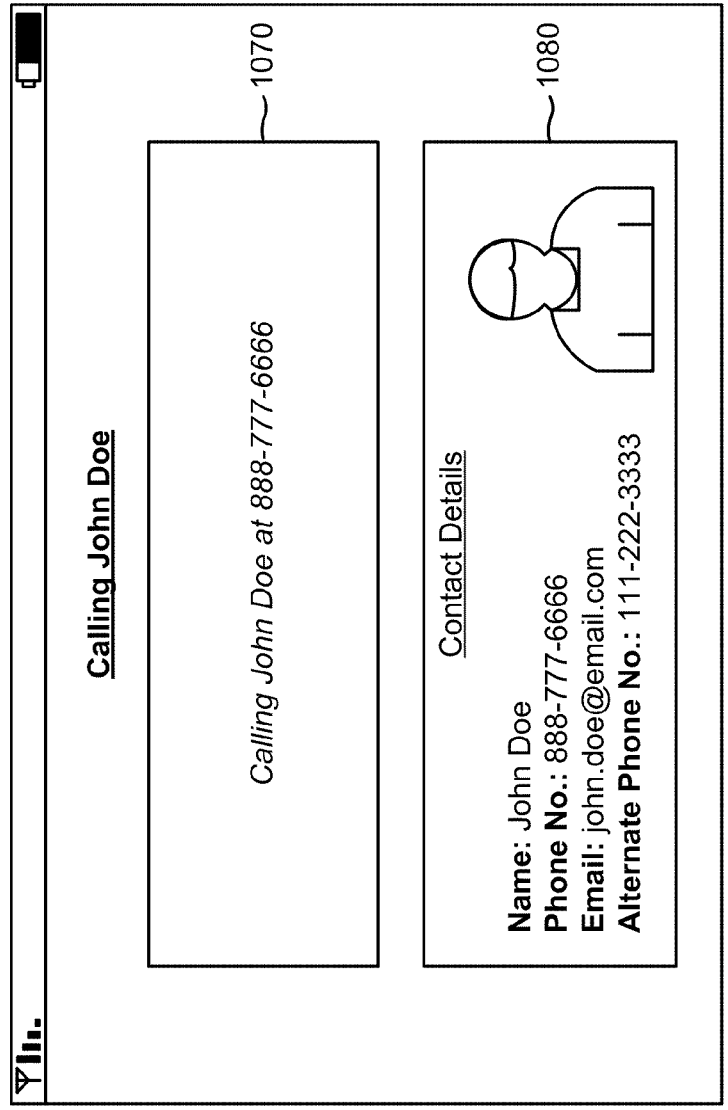
Figure 11:
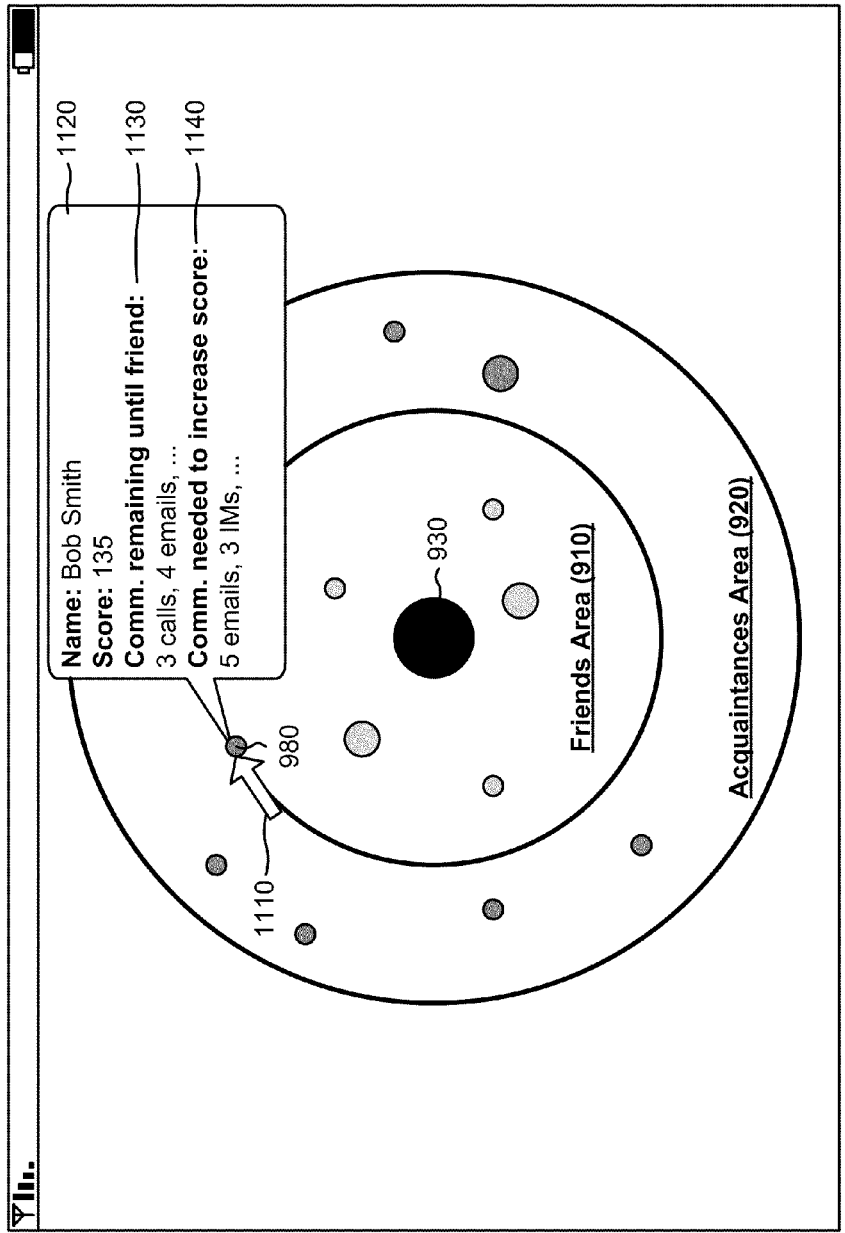

FIGS. 10A-11 are diagrams of example operations capable of being performed via circle of friends/acquaintances user interface 900 (FIG. 9). In one implementation, FIGS. 10A-10C are diagrams of example operations 1000 for contacting one or more friends and/or acquaintances of user 930 (e.g., via circle of friends/acquaintances user interface 900). As shown in FIG. 10A, a selection mechanism 1010 (e.g., a pointer) may be used to select (or hover over) one of the friends (e.g., popular friend 940) in friends area 910. For example, if selection mechanism 1010 selects (or hovers over) the circle representing popular friend 940, information about popular friend 940 may be displayed in a window 1020. Such information may include a name of popular friend 940 (e.g., "John Doe"), a user personality score of popular friend 940 (e.g., "150"), contact options (e.g., "Contact via IM, email, phone, etc.") associated with popular friend 940, etc.

If the user selects (e.g., via selection mechanism 1010) one of the contact options, user device 110 associated with the user may contact popular friend 940 via the selected contact option. For example, if the user selects (e.g., via selection mechanism 1010) a contact via IM option 1030, user device 110 may enable the user to input and send an instant message to John Doe (e.g., popular friend 940) as depicted in FIG. 10B. As further shown in FIG. 10B, the user may enter text for the instant message in a window 1050, and may send the instant message to John Doe by selecting a send button 1060. In another example, if the user selects (e.g., via selection mechanism 1010) a contact via phone option 1040 (FIG. 10A), user device 110 may place a call to John Doe (e.g., popular friend 940) as depicted in FIG. 10C. As further shown in FIG. 10C, user device 110 may display a window 1070 indicating that John Doe is being called a particular telephone number (e.g., stored in an address book associated with user device 110), and may display a window 1080 providing contact details (e.g., stored in the address book associated with user device 110) for John Doe. The contact details may include a variety of information, such as a name of the person being called (e.g., "John Doe"), a phone number of the person being called (e.g., "888-777-6666"), an email address of the person being called (e.g., "john.doe@email.com"), an alternate phone number of the person being called (e.g., "111-222-3333"), etc.

FIG. 11 is a diagram of example operations 1100 for determining statistics associated with one or more friends and/or acquaintances of user 930 (e.g., via user interface 900). As shown in FIG. 11, a selection mechanism 1110 (e.g., a pointer) may be used to select (or hover over) one of the acquaintances (e.g., transitioning acquaintance 980). For example, if selection mechanism 1110 selects (or hovers over) the circle representing transitioning acquaintance 980, statistical information about transitioning acquaintance 980 may be displayed in a window 1120. Such information may include a name of transitioning acquaintance 980 (e.g., "Bob Smith"), a user personality score of transitioning acquaintance 980 (e.g., "135"), a number 1130 of communications remaining until transitioning acquaintance 980 becomes a friend of user 930 (e.g., "3 calls, 4 emails, etc."), a number 1140 of communications needed to increase the user personality score of transitioning acquaintance 980 (e.g., "5 emails, 3 IMs, etc."), etc.

In one implementation, such statistical information may enable user 930 to communicate with transitioning acquaintance 980 so that transitioning acquaintance 980 becomes a friend of user 930. In other implementations, such statistical information may enable user 930 to communicate with transitioning acquaintance 980 until the user personality score associated with transitioning acquaintance 980 increases.

Although FIGS. 10A-11 show example operations capable of being performed via circle of friends/acquaintances user interface 900, in other implementations, fewer operations, different operations, or additional operations than depicted in FIGS. 10A-11 may be performed. Alternatively, or additionally, user interface 900 may depict less information, different information, differently arranged information, or additional information than depicted in FIGS. 10A-11.

FIGS. 12-17 are flow charts of an example process 1200 for determining personality scores of users based on communication behaviors of the users and according to implementations described herein. In one implementation, process 1200 may be performed by personality analyzer device 120. In another implementation, some or all of process 1200 may be performed by another device or group of devices (e.g., user device 110), including or excluding personality analyzer device 120.

Figure 12:
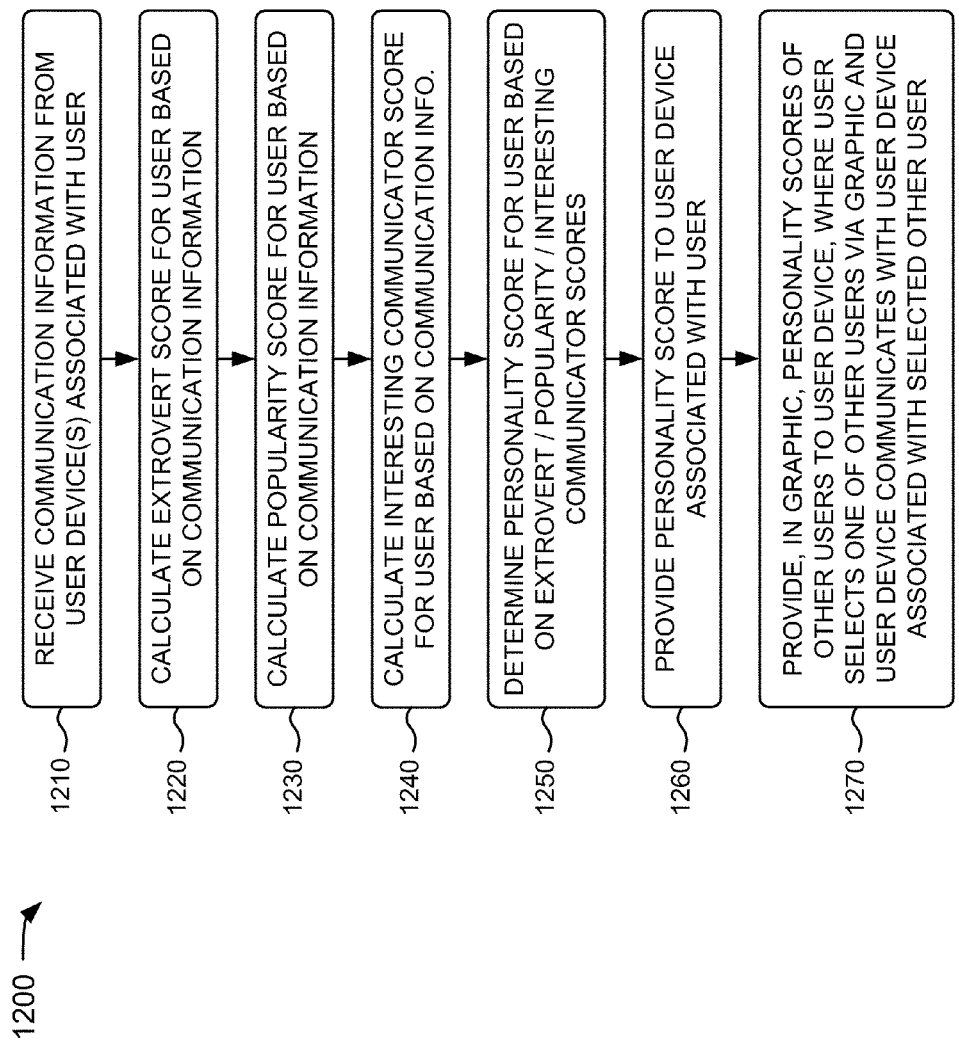
FIGS. 12-17 are flow charts of an example process for determining personality scores of users based on communication behaviors of the users and according to implementations described herein.

As illustrated in FIG. 12, process 1200 may include receiving communication information from user device(s) associated with a user (block 1210), calculating an extrovert score for the user based on the communication information (block 1220), and calculating a popularity score for the user based on the communication information (block 1230). For example, in implementations described above in connection with FIG. 5, communication information receiver 500 of personality analyzer device 120 may receive communication information 550 from one or more user devices 110 associated with a user. Communication information 550 may include types, amounts, frequencies, sources, and/or durations of one or more communications. Extrovert analyzer 510 of personality analyzer device 120 may receive communication information 550 from communication information receiver 500, and may calculate extrovert score 560 for the user based on communication information 550. Extrovert score 560 may provide a measure of whether the user is an extrovert or an introvert (e.g., in a given geographical region) compared to a statistical mean. Popularity analyzer 520 of personality analyzer device 120 may receive communication information 550 from communication information receiver 500, and may calculate popularity score 570 for the user based on communication information 550. Popularity score 570 may provide a measure of popularity of the user (e.g., in a given geographical region) compared to a statistical mean.

As further shown in FIG. 12, process 1200 may include calculating an interesting communicator score for the user based on the communication information (block 1240), and determining a personality score for the user based on the extrovert, popularity, and interesting communicator scores (block 1250). For example, in implementations described above in connection with FIG. 5, interesting communicator (IC) analyzer 530 of personality analyzer device 120 may receive communication information 550 from communication information receiver 500, and may calculate IC score 580 for the user based on communication information 550. IC score 580 may provide a measure of the user's capability of having interesting communications (e.g., conversations) with different people (e.g., in a given geographical region). Personality generator 540 of personality analyzer device 120 may receive extrovert score 560 from extrovert analyzer 510, may receive popularity score 570 from popularity analyzer 520, and may receive IC score 580 from IC analyzer 530. Personality generator 540 may generate user personality score 330 (or 470) based on extrovert score 560, popularity score 570, and/or IC score 580.

Returning to FIG. 12, process 1200 may include providing the personality score to a user device associated with the user (block 1260), and providing, in a graphic, personality scores of other users to the user device, where the user selects one of the other users via the graphic and the user device communicates with a user device associated with the selected other user (block 1270).

For example, in implementations described above in connection with FIGS. 5, 9, and 10A, personality generator 540 may provide user personality score 330 (or 470) to one or more user devices 110 associated with the user. In one example, personality generator 540 may generate user personality scores for friends and/or acquaintances of a user. Personality generator 540 may provide the user personality scores for the friends and/or acquaintances to one or more user devices 110 associated with the user. In another example, circle of friends/acquaintances user interface 900 may be provided as part of user personality score 330 or user personality score 470. User interface 900 may include friends area 910 and acquaintances area 920. Friends area 910 may include a circular area surrounding user 930 (e.g., a user of user device 110) and defining other users that are friends of user 930. Acquaintances area 920 may include a circular area surrounding user 930 and defining other users that are acquaintances of user 930. Selection mechanism 1010 (e.g., a pointer) may be used to select (or hover over) one of the friends (e.g., popular friend 940) in friends area 910. If selection mechanism 1010 selects (or hovers over) the circle representing popular friend 940, information about popular friend 940 may be displayed in a window 1020. Such information may include contact options (e.g., "Contact via IM, email, phone, etc.") associated with popular friend 940. If the user selects (e.g., via selection mechanism 1010) one of the contact options, user device 110 associated with the user may contact popular friend 940 via the selected contact option.

Figure 13:
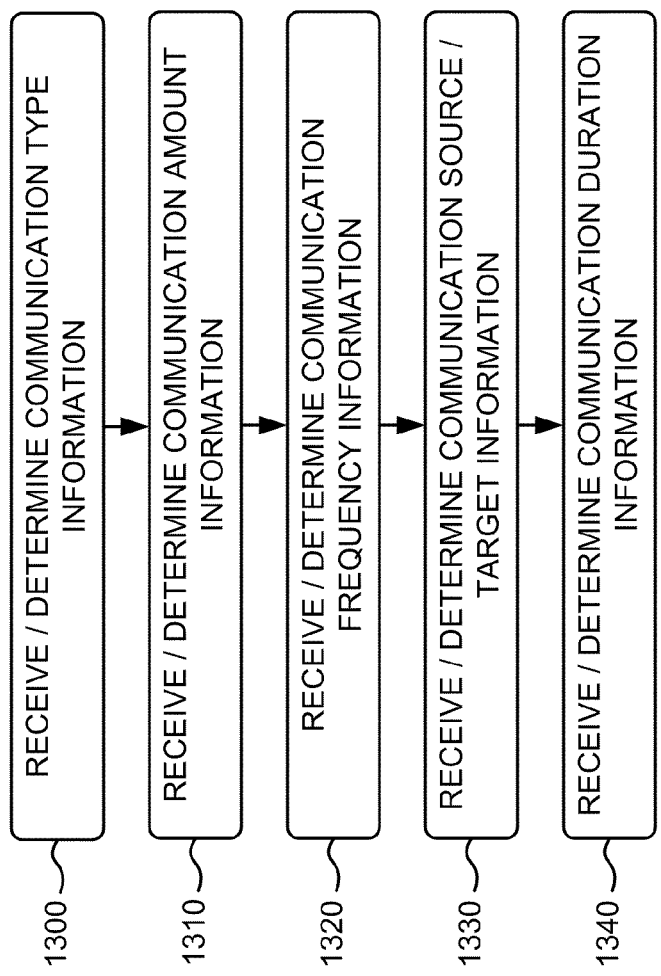

Process block 1210 may include the process blocks illustrated in FIG. 13. As shown in FIG. 13, process block 1210 may include receiving or determining communication type information (block 1300); receiving or determining communication amount information (block 1310); receiving or determining communication frequency information (block 1320); receiving or determining communication source or target information (block 1330); receiving or determining communication duration information (block 1340).

For example, in implementations described above in connection with FIG. 5, communication information receiver 500 of personality analyzer device 120 may receive communication information 550 from one or more user devices 110 associated with a user. Communication information 550 may include types, amounts, frequencies, sources, targets, and/or durations of one or more communications. A "type" of communication may refer to a particular communication mode (e.g., telephone calls, SMS messages, etc.) used to communicate information. An "amount" of communication may refer to a quantity of communications initiated and/or received by the user (e.g., via user devices 110). A "frequency" of communication may refer to how often communications are initiated and/or received by the user (e.g., via user devices 110). A "source" of communication may refer to a particular user and/or user device 110 that initiates communications. A "target" of communication may refer to a particular user and/or user device 110 that receives communications 310. A "duration" of communication may refer to an amount of time that elapses during one or more communications. Alternatively, or additionally, communication information receiver 500 may communicate with user devices 110 (e.g., to analyze communications generated by user devices 110), and may determine communication information 550 based on the analyzed communications.

Figure 14:
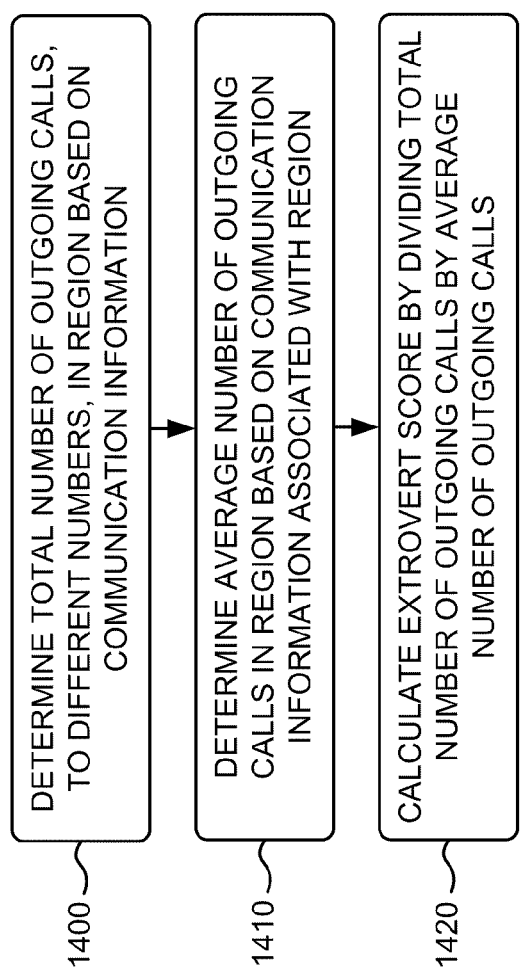

Process block 1220 may include the process blocks illustrated in FIG. 14. As shown in FIG. 14, process block 1220 may include determining a total number of outgoing calls, to different numbers, in a region based on the communication information (block 1400), determining an average number of outgoing calls in the region based on the communication information associated with the region (block 1410), and calculating the extrovert score by dividing the total number of outgoing calls by the average number of outgoing calls (block 1420). For example, in implementations described above in connection with FIG. 5, extrovert analyzer 510 may determine (e.g., from communication information 550) a total number of outgoing calls (TOC) placed by the user to different phone numbers during a time period (t) over which statistics are collected; and an average number of total outing calls (AOC) placed by other users in the given geographical region during the time period (t). Extrovert analyzer 510 may calculate extrovert score (E) 560 according to the following equation:

$$E = \frac{TOC}{AOC}.$$

Figure 15:
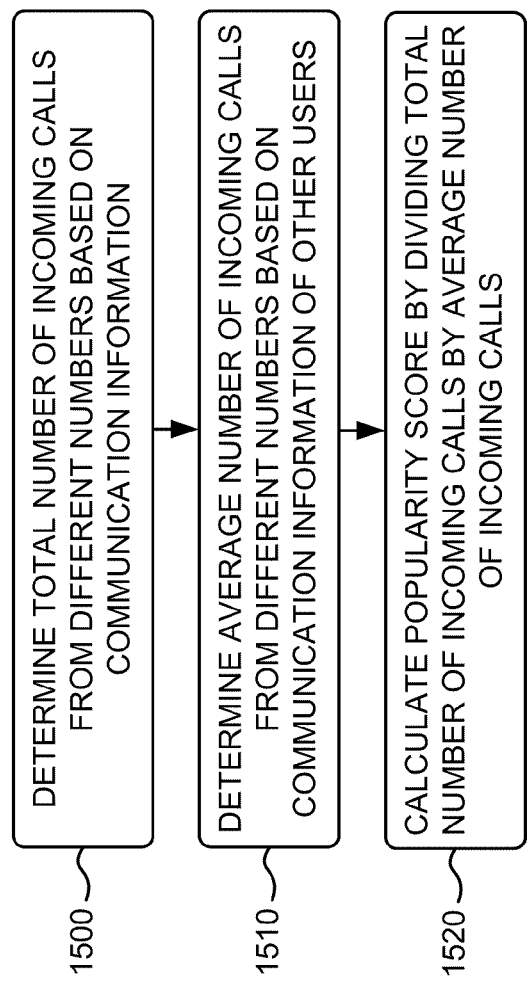

Process block 1230 may include the process blocks illustrated in FIG. 15. As shown in FIG. 15, process block 1230 may include determining a total number of incoming calls from different numbers based on the communication information (block 1500), determining an average number of incoming calls from different numbers based on the communication information associated with other users (block 1510), and calculating the popularity score by dividing the total number of incoming calls by the average number of incoming calls (block 1520). For example, in implementations described above in connection with FIG. 5, popularity analyzer 520 may determine (e.g., from communication information 550) a total number of incoming calls (TIC) received by the user from different phone numbers during a time period (t) over which statistics are collected; and an average number of total incoming calls (AIC) received by other users from different phone numbers during the time period (t). Popularity analyzer 520 may calculate popularity score (P) 570 according to the following equation:

$$P = \frac{TIC}{AIC}.$$

Figure 16:
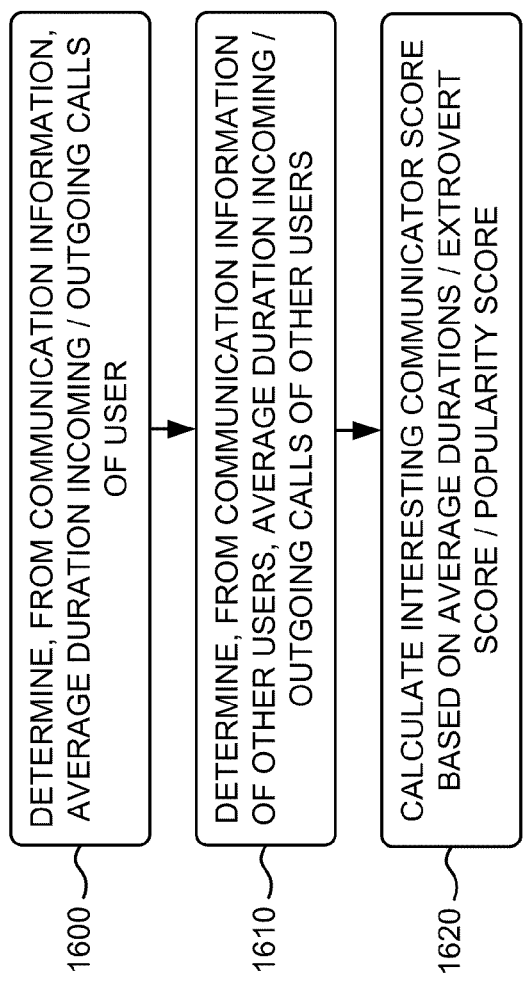

Process block 1240 may include the process blocks illustrated in FIG. 16. As shown in FIG. 16, process block 1240 may include determining, from the communication information, an average duration of incoming and outgoing calls of the user (block 1600), determining, from communication information of other users, an average duration of incoming and outgoing calls of the other users (block 1610), and calculating the interesting communicator score based on the average durations, the extrovert score, and the popularity score (block 1620). For example, in implementations described above in connection with FIG. 5, IC analyzer 530 may determine (e.g., from communication information 550) an average length of incoming and outgoing calls (SALC) received by and/or placed by the user during a time period (t) over which statistics are collected; and an average length of incoming and outgoing calls (PALC) generated by other users in the geographical region during the time period (t). IC analyzer 530 may calculate IC score (IC) 580 according to the following equation:

$$IC = \frac{SALC \times E + SALC \times P}{PALC \times 2},$$

where "E" may correspond to extrovert score 560 and "P" may correspond to popularity score 570.

Figure 17:
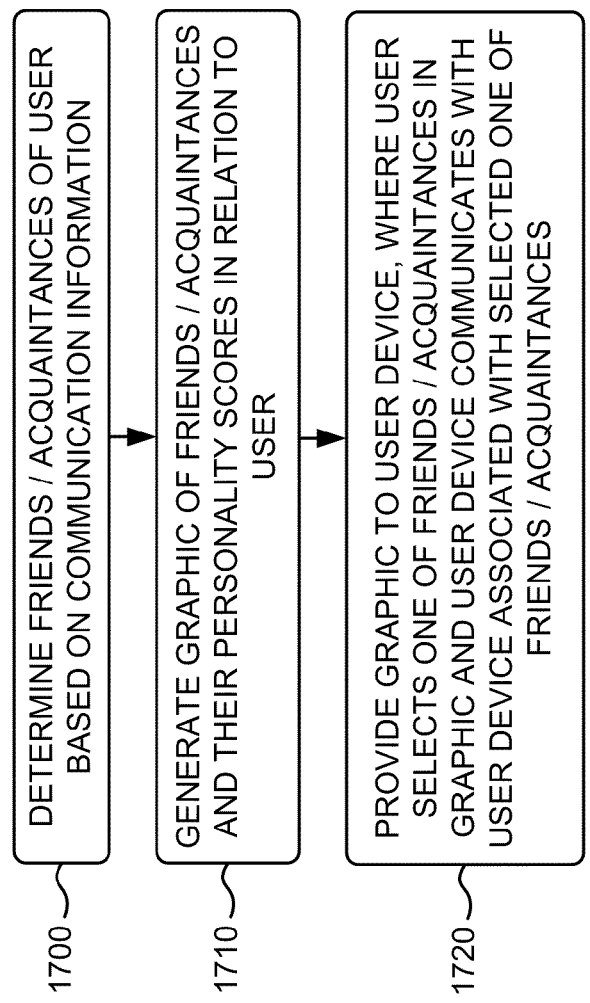

Process block 1270 may include the process blocks illustrated in FIG. 17. As shown in FIG. 16, process block 1270 may include determining friends and/or acquaintances of the user based on the communication information (block 1700), generating a graphic of the friends and/or acquaintances and their personality scores in relation to the user (block 1710), and providing the graphic to the user device, where the user selects one of the friends and/or acquaintances via the graphic and the user device communicates with a user device associated with the selected one of the friends and/or acquaintances (block 1720).

For example, in implementations described above in connection with FIGS. 5, 9, and 10A, personality generator 540 may generate user personality scores for friends and/or acquaintances of a user. The friends and/or acquaintances of the user may be determined (e.g., by personality analyzer device 120) based on a variety of information, such as communication information 550; address book information (e.g., email addresses, telephone numbers, incoming emails, outgoing emails, incoming calls, outgoing calls, etc.) associated with the user; account information (e.g., user profile information, contacts, etc.) associated with the user; etc. Personality generator 540 may provide the user personality scores for the friends and/or acquaintances of the user to one or more user devices 110 associated with the user. In one example, circle of friends/acquaintances user interface 900 may be provided as part of user personality score 330 or user personality score 470. User interface 900 may include friends area 910 and acquaintances area 920. Friends area 910 may include a circular area surrounding user 930 (e.g., a user of user device 110) and defining other users that are friends of user 930. Acquaintances area 920 may include a circular area surrounding user 930 and defining other users that are acquaintances of user 930. Selection mechanism 1010 (e.g., a pointer) may be used to select (or hover over) one of the friends (e.g., popular friend 940) in friends area 910. If selection mechanism 1010 selects (or hovers over) the circle representing popular friend 940, information about popular friend 940 may be displayed in a window 1020. Such information may include contact options (e.g., "Contact via IM, email, phone, etc.") associated with popular friend 940. If the user selects (e.g., via selection mechanism 1010) one of the contact options, user device 110 associated with the user may contact popular friend 940 via the selected contact option.

Systems and/or methods described herein may enable a user of one or more user devices (e.g., mobile communication devices, personal computers, laptop computers, etc.) to determine a personality score of the user based on the user's communications behaviors (e.g., via the one or more user devices). In one implementation, for example, the systems and/or methods may receive communication information from user device(s) associated with a user, may calculate an extrovert score for the user based on the communication information, and may calculate a popularity score for the user based on the communication information. The systems and/or methods may calculate an interesting communicator score for the user based on the communication information, may determine a personality score for the user based on the extrovert, popularity, and interesting communicator scores, and may provide the personality score to a particular user device associated with the user. The systems and/or methods may provide, in a graphic and to the particular user device, personality scores of other users. The user may select one of the other users, via the graphic, and the particular user device may communicate with a user device associated with the selected other user.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 12-17, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement aspects described herein is not limiting of the invention. Thus, the operation and behavior of the aspects were described without reference to the specific software code—it being understood that software and control hardware may be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving, by the computing device, communication information from a user device associated with a user;
   calculating, by the computing device, an extrovert score for the user based on the communication information, wherein the extrovert score is a measurement that relates to at least a number of outgoing calls to different users, and
   wherein calculating the extrovert score for the user includes:
   determining a total number of outgoing calls placed by the user, to different telephone numbers in a region, based on the communication information,
   determining an average number of outgoing calls in the region based on communication information associated with the region, and
   calculating the extrovert score by dividing the determined total number of outgoing calls by the determined average number of outgoing calls;
   calculating, by the computing device, a popularity score for the user based on the communication information, where the popularity score is based on at least a measure related to a number of incoming calls received from different users in the region;
   calculating, by the computing device, an interesting communicator score for the user based on the communication information, where the interesting communicator score is based on at least measurements related to different incoming and outgoing calls;
   determining, by the computing device, a personality score for the user based on a weighted average of the extrovert score, the popularity score, and the interesting communicator score; and
   storing, by the computing device, the personality score.

2. The computing device-implemented method of claim 1, further comprising:
   providing the personality score to the user device associated with the user.

3. The computing device-implemented method of claim 1, where receiving communication information includes one or more of:
   receiving communication type information,
   receiving communication amount information,
   receiving communication frequency information,
   receiving communication source or target information, or
   receiving communication duration information.

4. The computing device-implemented method of claim 1, wherein determining the personality score for the user includes assigning weighted values to at least one of the extrovert score, the popularity score, and the interesting communicator score.

5. The computing device-implemented method of claim 1, where calculating a popularity score for the user includes:
   determining a total number of incoming calls received by the user, from different telephone numbers in a region, based on the communication information,
   determining an average number of incoming calls, from different telephone numbers in the region, based on communication information associated with the region, and
   calculating the popularity score by dividing the determined total number of incoming calls by the determined average number of incoming calls.

6. A computing device-implemented method comprising:
   receiving, by the computing device, communication information from a user device associated with a user;
   calculating, by the computing device, an extrovert score for the user based on the communication information;
   calculating, by the computing device, a popularity score for the user based on the communication information;
   calculating, by the computing device, an interesting communicator score for the user based on the communication information, where calculating the interesting communicator score for the user includes:
      determining, based on the communication information, an average duration of incoming and outgoing calls associated with the user,
      determining, based on communication information associated with other users, an average duration of incoming and outgoing calls associated with the other users, and
      calculating the interesting communicator score based on the determined average durations, the extrovert score, and the popularity score;
   determining, by the computing device, a personality score for the user based on a weighted average of the extrovert score, the popularity score, and the interesting communicator score; and
   storing, by the computing device, the personality score.

7. The computing device-implemented method of claim 1, further comprising:
   providing, in a graphic and to the user device, personality scores of other users and representations of the other users,
   where, when the user selects one of the other users, via the representations of the other users provided in the graphic, the user device communicates with a user device associated with the selected one of the other users.

8. The computing device-implemented method of claim 1, further comprising:
   determining friends and acquaintances of the user based on the communication information;
   generating a graphic of representations of the friends and acquaintances, and their personality scores, in relation to the user; and
   providing the graphic to the user device,
   where, when the user selects one of the friends and acquaintances, via the representations of the friends and acquaintances provided in the graphic, the user device communicates with a user device associated with the selected one of the friends and acquaintances.

9. The computing device-implemented method of claim 1, where the user device includes one or more of:
   a radiotelephone,
   a personal communications system (PCS) terminal,
   a personal digital assistant (PDA),
   a wireless device,
   a cellular telephone,
   a smart phone,
   a laptop computer,
   a personal computer,
   a set-top box (STB),
   a television,
   a gaming system,
   a global positioning system (GPS) device,
   a content recording device, or
   a vehicular computing and communication device.

10. A device comprising:
    a memory to store a plurality of instructions; and
    a processor to execute instructions in the memory to:
       receive communications associated with a user device of a user, generate, based on the received communications, communication information associated with the user device,
       calculate an extrovert score for the user based on the communication information, and wherein calculating the extrovert score for the user is based on a measurement that relates to at least the number of outgoing calls to different users in a region,
       calculate a popularity score for the user based on the communication information, wherein calculating the popularity score for the user is based on a measurement that relates to at least the total number of incoming calls received from different users in the region,
       calculate an interesting communicator score for the user based on a measure of different incoming calls and different outgoing calls to and from other user devices in the region,
       determine a personality score for the user based on a weighted average of the extrovert score, the popularity score, and the interesting communicator score, and
       provide the personality score to the user device associated with the user.

11. The device of claim 10, where the processor is further to execute instructions in the memory to:
    store the personality score in the memory.

12. The device of claim 10, where the communications include one or more of:
    short message service (SMS) messages,
    electronic mail (email) messages,
    multimedia message service (MMS) messages,
    instant messages (IMs), or
    telephone calls.

13. The device of claim 10, where the communication information includes one or more of:
    types of the communications,
    amounts of the communications,
    frequencies of the communications,
    sources of the communications,
    targets of the communications, or
    durations of the communications.

14. The device of claim 10, where, when calculating an extrovert score for the user, the processor is further to execute instructions in the memory to:
    determine a total number of outgoing calls placed by the user, to different telephone numbers in a region, based on the communication information, determine an average number of outgoing calls in the region based on communication information associated with the region, and calculate the extrovert score by dividing the determined total number of outgoing calls by the determined average number of outgoing calls.

15. The device of claim 10, where, when calculating a popularity score for the user, the processor is further to execute instructions in the memory to:

determine a total number of incoming calls received by the user, from different telephone numbers in the region, based on the communication information, determine an average number of incoming calls, from different telephone numbers in the region, based on communication information associated with the region, and calculate the popularity score by dividing the determined total number of incoming calls by the determined average number of incoming calls.

16. A device comprising:

a memory to store a plurality of instructions; and a processor to execute instructions in the memory to:

receive communications associated with a user device of a user, generate, based on the received communications, communication information associated with the user device, calculate an extrovert score for the user based on the communication information, calculate a popularity score for the user based on the communication information, calculate an interesting communicator score for the user based on the communication information, where, when calculating an interesting communicator score for the user, the processor is further to execute instructions in the memory to:

determine, based on the communication information, an average duration of incoming and outgoing calls associated with the user, determine, based on communication information associated with other users, an average duration of incoming and outgoing calls associated with the other users, and calculate the interesting communicator score based on the determined average durations, the extrovert score, and the popularity score;

determine a personality score for the user based on a weighted average of the extrovert score, the popularity score, and the interesting communicator score, and provide the personality score to the user device associated with the user.

17. The device of claim 10, where the processor is further to execute instructions in the memory to:

provide, in a graphic and to the user device, personality scores of other users and representations of the other users, where, when the user selects one of the other users, via the representations of the other users provided in the graphic, the user device communicates with a user device associated with the selected one of the other users.

18. The device of claim 10, where the processor is further to execute instructions in the memory to:

determine friends and acquaintances of the user based on the communication information, generate a graphic of representations of the friends and acquaintances, and their personality scores, in relation to the user, and provide the graphic to the user device, where, when the user selects one of the friends and acquaintances, via the representations of the friends and acquaintances provided in the graphic, the user device communicates with a user device associated with the selected one of the friends and acquaintances.

19. The device of claim 10, where the representations of the friends and acquaintances are sized in proportion to their personality scores.

20. A user device associated with a user, the user device comprising:

a memory to store a plurality of instructions; and a processor to execute instructions in the memory to:

perform communications with other user devices, generate, based on the communications, communication information associated with the user device, provide the communication information to a personality analyzer device, where the personality analyzer device determines:

a first score based on a measure of a total number of outgoing calls placed by the user device, to the other user devices in a particular region, a second score based on a measure of different incoming calls from the other user devices in the particular region, and a third score based on a measure of different incoming calls and different outgoing calls to and from other user devices, and a personality score for the user based on the communication information, and the weighted average of the first score, the second score, and the third score, and receive the personality score from the personality analyzer device.

* * * * *